United States Patent
Henn et al.

(10) Patent No.: US 8,709,606 B2
(45) Date of Patent: Apr. 29, 2014

(54) GLASS OR GLASS-CERAMIC PANE REFLECTING INFRARED RADIATION

(75) Inventors: Christian Henn, Frei-Laubersheim (DE); Veit Luther, Hattersheim (DE); Andreas Hahn, Hochstetten-Dhaun (DE); Wolfgang Schmidbauer, Mainz (DE)

(73) Assignee: Schott AG, Mainz (DE)

( * ) Notice: Subject to any disclaimer, the term of this patent is extended or adjusted under 35 U.S.C. 154(b) by 385 days.

(21) Appl. No.: 12/751,416

(22) Filed: Mar. 31, 2010

(65) Prior Publication Data

US 2010/0279077 A1     Nov. 4, 2010

(30) Foreign Application Priority Data

Mar. 31, 2009 (DE) .......................... 10 2009 017 547

(51) Int. Cl.
*C03C 17/245* (2006.01)

(52) U.S. Cl.
USPC .......................................... 428/446; 428/432

(58) Field of Classification Search
USPC ....................................................... 428/432
See application file for complete search history.

(56) References Cited

U.S. PATENT DOCUMENTS

| | | | | |
|---|---|---|---|---|
| 3,974,316 A * | 8/1976 | Jacquemin et al. | ............ | 428/215 |
| 4,265,974 A | 5/1981 | Gordon | ............ | 428/432 |
| 6,124,026 A * | 9/2000 | McCurdy et al. | ............ | 428/216 |
| 6,231,971 B1 * | 5/2001 | Terneu et al. | ............ | 428/336 |
| 6,416,890 B1 | 7/2002 | Terneu et al. | ............ | 428/701 |
| 6,447,921 B1 * | 9/2002 | Norimatsu et al. | ............ | 428/432 |
| 6,838,178 B1 * | 1/2005 | Strickler et al. | ............ | 428/432 |
| 7,005,182 B1 * | 2/2006 | Hecq et al. | ............ | 428/336 |
| 7,449,244 B2 | 11/2008 | Vilato et al. | | |
| 2005/0164014 A1 * | 7/2005 | Tomonaga et al. | ............ | 428/432 |
| 2007/0031682 A1 * | 2/2007 | Krasnov | ............ | 428/432 |
| 2007/0122632 A1 * | 5/2007 | Zijp et al. | ............ | 428/432 |
| 2007/0190339 A1 * | 8/2007 | Tixhon et al. | ............ | 428/432 |
| 2007/0275252 A1 * | 11/2007 | Krasnov | ............ | 428/432 |
| 2008/0184740 A1 * | 8/2008 | Waldschmidt et al. | ............ | 65/17.2 |

FOREIGN PATENT DOCUMENTS

| | | |
|---|---|---|
| DE | 102007036407 | 9/2008 |
| EP | 2236473 | 6/2010 |

OTHER PUBLICATIONS

"Soda Lime FLat Float Glass," downloaded from http://www.valleydesign.com/sodalime.htm, no author, Jan. 2008.*
"SCHOTT Technical Glasses, Physical and technical properties", no author, Nov. 2007.*
Search report dated Mar. 19, 2010 in corresponding to German Patent Application No. 10 2009 017 547.4-45.
European Search Report dated Jul. 29, 2010 for corresponding European Patent Application No. 10003456.0-1218.
Bisht, H. et al., "Comparison of spray pyrolyzed FTO, ATO and ITO coatings for flat and bent glass substrates," Thin Solid Films 351 (1999), pp. 109-114, Germany.
Kojima, M. et al., "Transparent furnace made of heat mirror," Thin Solid Films 392 (2001), pp. 349-354, Japan.
European Search Report dated Sep. 8, 2010 for corresponding European Patent Application No. 10003456.0-1218.

(Continued)

*Primary Examiner* — David Sample
(74) *Attorney, Agent, or Firm* — Ohlandt, Greeley, Ruggiero & Perle, LLP

(57) ABSTRACT

A temperature-resistant glass or glass-ceramic pane is provided. The pane includes a substrate and a tin-oxide layer comprising antimony deposited on the substrate.

12 Claims, 4 Drawing Sheets

(56) References Cited

OTHER PUBLICATIONS

Office action dated Sep. 29, 2011, corresponding to European Patent Application No. 10 003 456.0-1218.

Vogel, W., "Glass Chemistry;" Second Ed., 1925, ISBN 0-387-57572-3, pp. 138 and 295-297.

English translation of European Search Report dated Jul. 27, 2010 for corresponding European Patent Application No. 10003456.0-1218 (non-English European Search Report previously submitted on Sep. 16, 2010).

* cited by examiner

GLASS OR GLASS-CERAMIC PANE REFLECTING INFRARED RADIATION

CROSS REFERENCE TO RELATED APPLICATIONS

This application claims benefit under 35 U.S.C. §119(a) of German Patent Application No. 10 2009 017 547.4-45, filed Mar. 31, 2009, the entire contents of which are incorporated herein by reference.

BACKGROUND OF THE INVENTION

1. Field of the Invention

The invention relates to a glass or glass-ceramic pane reflecting infrared radiation as well as a method for the production thereof. In particular, the invention relates to a front pane for an oven or a fireplace, as well as a fireproof glazing.

2. Description of Related Art

Panes reflecting infrared radiation, in particular, baking-oven panes or fireplace viewing panes are known. Usually these involve a substrate glass made of glass or glass ceramics, which is provided with a coating that has a lower transmission in the infrared region than in the region of visible light. Thus, the user can look inside the oven or the fireplace, whereby, for example, infrared radiation arising in the oven due to a fire is only partially emitted into the environment.

Based on the structure reflecting infrared radiation, therefore, not only is the heating of articles in the vicinity of the oven reduced, but also a warming of the pane and the environment of the pane to temperatures that could lead to combustion upon contact can be avoided.

Conventional coatings for glass-ceramic panes are constructed, for example, of tin-doped indium oxide. Further, aluminum-doped tin-oxide layers as well as fluorine-doped tin-oxide layers are known. A higher reflectance can be achieved with such coatings for wavelengths even starting from approximately 2000 nanometers (nm).

However, it has been shown to be a disadvantage of known coatings reflecting infrared radiation, that with a high heat load, particularly at temperatures over 450 degrees Celsius (°C.), the layers lose their reflecting effect in the infrared region, in part permanently.

Thus, only long-term temperature loads of 500° C. at most can be attained. These types of glass-ceramic panes are thus not optimally suitable as panes for fireproof applications.

In addition, temperatures of approximately 900° C. are reached in the ceramicizing process in the production of glass ceramics from green glass. After heating to this temperature, conventional layers reflecting infrared radiation largely lose their effect.

It is a more complex process to introduce a layer reflecting infrared radiation after the ceramicizing process; in particular, glass panes that are shaped, especially bent in the course of the ceramicizing process, and thus are brought to the desired final shape can be provided with a uniform coating only in a very complex procedure.

BRIEF SUMMARY OF THE INVENTION

In contrast, the object of the invention is to provide a glass or glass-ceramic pane reflecting infrared radiation, in which the named disadvantages of the prior art are at least reduced.

In particular, a glass or glass-ceramic pane with a high heat resistance shall be provided.

Another object of the invention is to provide a glass or glass-ceramic pane that can be produced in a simple and cost-effective manner.

Finally, it is an object of the invention to provide a pane with good optical appearance.

The object of the invention is solved by a glass or glass-ceramic pane as well as by a method for producing a glass or glass-ceramic pane reflecting infrared radiation according to the present disclosure.

On the one hand, the invention relates to a glass or glass-ceramic pane, particularly formed as a fireproof glazing, as a front pane for an oven or a fireplace, or as an oven muffle, which comprises a tin-oxide layer reflecting infrared radiation and containing antimony oxide.

Further, the glass or glass-ceramic pane comprises a glass or glass-ceramic substrate with a thermal expansion coefficient a of less than 4.2, preferably less than 3.5. Therefore, glasses with high temperature resistance or glass ceramics are used.

The antimony-doped tin-oxide layer is formed as a single-layer reflection layer. A single-layer reflection layer is understood to be a layer that does not reflect as an optical alternating layer system due to its structure. Rather, due to its crystalline properties of defects caused by the antimony and of released electrons due to the doping, an antimony-doped tin-oxide layer appears to have use for a reflection effect in the infrared region.

In the visible region, in contrast, the layer is transparent, thus permeable at least for a portion of the visible light, so that the pane can be used as a viewing window.

The inventors have discovered that tin-oxide layers doped with antimony oxide have a high temperature resistance with a simultaneous good reflection effect in the infrared region.

In particular, the inventors have found that the layers are transparent in the visible region from the beginning, thus even without thermal post-treatment, and simultaneously have a relatively high reflectance in the infrared region.

In particular, even at a wavelength between 3000 and 4000 nm, a reflectance of more than 30%, preferably more than 40% will be achieved, whereby the average transmittance in the visible region amounts to more than 40%, preferably more than 50%, and particularly preferred more than 70%.

The inventors have additionally discovered that with this type of coating, after tempering at temperatures of up to 900° C., the infrared-radiation reflecting effect not only remains present, but is even improved.

A tin-oxide layer is understood to be a layer that predominantly contains tin oxide. It is understood that in addition to antimony oxide, the coating may contain other components.

In addition, it has turned out that the coating according to the invention can lead to a type of smoked glass, i.e., a gray appearance, and thus has a very nice optical appearance when compared with colored coatings.

In one embodiment of the invention, the tin-oxide layer is directly adjacent to the glass or glass-ceramic substrate. The tin-oxide layer is thus directly introduced onto the substrate. The inventors have discovered that even when it is introduced directly onto the substrate, which is optionally preheated, a sufficient resistance to abrasion can be achieved.

In an alternative embodiment, a layer of bonding agent is disposed between the tin-oxide layer and the glass or glass-ceramic substrate.

This embodiment of the invention is particularly suitable for the deposition of tin-oxide layers prior to a thermal post-treatment of the glass, in particular prior to a subsequent ceramicizing process.

A plurality of materials, in particular silicon oxide or aluminum oxide, as well as deposited soft layers with a high carbon fraction are suitable as the bonding-agent layer. The bonding-agent layer can be introduced by different types of coating methods, such as flame pyrolysis, rolling, spraying, or a PVD or CVD method.

In an enhancement of the invention, an anti-reflection layer is introduced on the tin-oxide layer, and this has an anti-reflection effect in the visible region. This may involve an interference system, in particular. This embodiment of the invention is particularly suitable for panes of fireproof doors.

The pane is preferably formed as a glass-ceramic pane. These types of materials can also be provided as very temperature-stable flat glass that can accept high mechanical loads. In particular, such a material can be provided as a so-called zero-expansion material, for which the thermal expansion coefficient for length amounts to less than $\pm 0.8*10^{-6}$ $K^{-1}$ between 20 and 700° C.

In a preferred embodiment of the invention, the ratio of antimony to tin in the infrared radiation-reflecting tin-oxide layer amounts to between 0.5 and 20%, preferably between 1 and 12%, and particularly preferred between 2 and 6% (determined on the basis of weight percent).

In particular, it has been discovered that a particularly good reflection effect in the preferred range can be achieved along with simultaneous good transmission in the visible region.

The infrared radiation-reflecting tin-oxide layer is preferably introduced by means of a deposition method, in particular sputtering, and in a preferred embodiment of the invention has a thickness between 20 and 2000 nm, preferably between 200 and 1000 nm, and particularly preferred between 600 and 700 nm.

It is understood that the layer need not specifically be formed as a single layer, but that the layer may also be a part of a multilayer system.

The plasma edge, which splits the reflection spectrum into two regions, may lie at under 3000 nm, preferably under 2500 nm, and particularly preferred under 2000 nm, in the layers according to the invention. A pane formed in this way is particularly suitable as a front pane for fireplaces, in which the fire typically emits very short-wave radiation—with an intensity maximum at approximately 2500 nm.

In addition, the invention relates to a method for producing a glass or glass-ceramic pane reflecting infrared radiation, in which a substrate, in particular a glass substrate is provided, and a tin-oxide layer containing antimony oxide is deposited on the substrate.

A glass or glass-ceramic substrate with a thermal expansion coefficient a of less than 4.2, preferably less than 3.5, is used as the substrate.

A crystalline layer, which has a uniform perceived color, is preferably introduced with the method.

The layer is preferably deposited by means of sputtering, CVD or sol-gel methods, in particular by means of a magnetron sputtering method. Large surface areas can also be coated in a cost-effective way with these types of sputtering methods.

In a preferred embodiment of the invention, a target that is particularly formed ceramically and contains antimony oxide and tin oxide is used.

This embodiment of the invention has the advantage that the composition of the target can be transferred in an almost identical form to the substrate by means of a sputtering method. Thus, on the one hand, only one target needs to be used. In addition, with the use of a ceramic target, the metering of oxygen during the sputtering process is not absolutely necessary.

Of course, it has turned out that even with the use of a ceramic target, it may be advantageous to introduce oxygen during the sputtering, each time as a function of the desired layer properties. In fact, a higher fraction of oxygen leads to a somewhat smaller reflection effect in the infrared region. The transmission in the visible region, however, simultaneously increases to a great extent.

In a preferred embodiment of the invention, the tin-oxide layer containing antimony oxide is deposited on a green glass (glass blank for a ceramicizing process), which is ceramicized after the deposition of the layer.

It has turned out that the tin-oxide layer according to the invention tolerates temperatures of approximately 900° C. occurring in a ceramicizing process, without losing its effect of reflecting infrared radiation.

Thus, the layer can be introduced prior to the ceramicizing and the pane can be shaped in the hot state, in particular can be bent, during the ceramicizing process, essentially assuming its final shape.

In a preferred embodiment of the invention, the substrate is heated to at least 550° C., preferably to at least 850° C., after the deposition of the tin-oxide layer containing antimony oxide. Such a heating can, but need not, be carried out in the course of a ceramicizing process. Rather, it has been shown that the effect of reflecting infrared radiation in fact increases in tempering.

During the deposition, in particular during the sputtering of the infrared radiation-reflecting tin-oxide layer, in a preferred embodiment of the invention, the substrate is kept at a temperature between 150 and 600° C., preferably between 300 and 500° C.

The heating of the substrate, on the one hand, leads to the removal of water, in particular in the region of the substrate that is near the surface. On the other hand, a more uniform layer growth can be attained by heating the substrate.

The invention can provide glass or glass-ceramic panes with a permanent use temperature of more than 600° C., or, in fact, more than 700° C. Such panes are thus also suitable as fireproof glass.

DETAILED DESCRIPTION OF THE INVENTION

The invention will be explained in the following in more detail with reference to FIG. 1 to FIG. 4 of the drawings.

Figure 1:
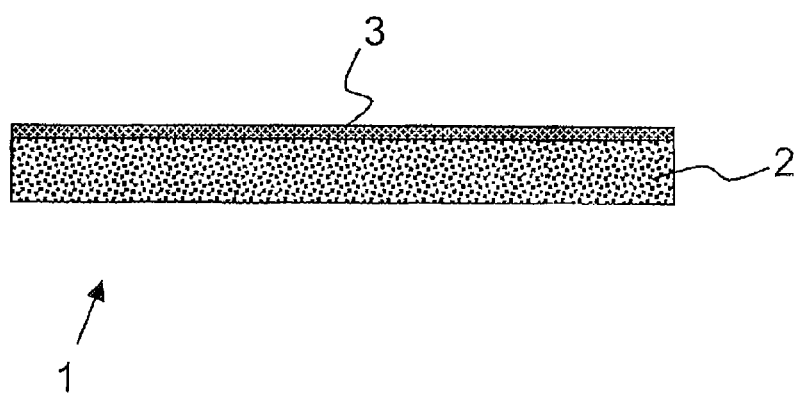
FIG. 1 shows schematically an example of embodiment of a glass or glass-ceramic pane.

FIG. 1 shows schematically a glass or glass-ceramic pane 1, which comprises a ceramic substrate 2. Ceramic substrate 2 is formed as a zero-expansion material. A tin-oxide layer containing antimony oxide 3 is deposited on substrate 2. The ratio of antimony to tin in this embodiment of the invention amounts to approximately 6%.

Figure 2:
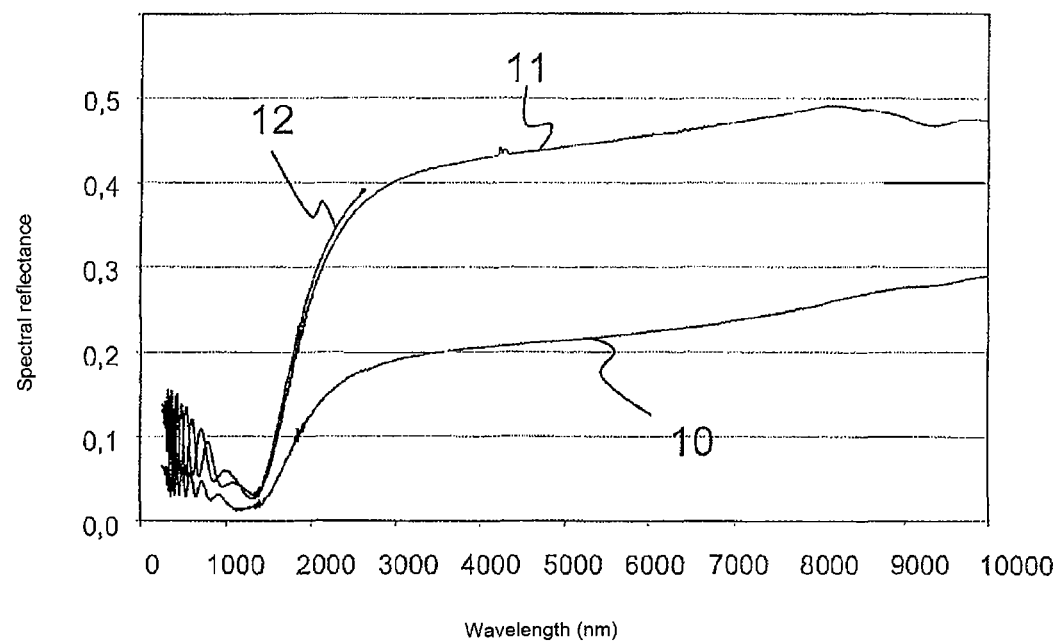
FIGS. 2 and 3, by way of example, show spectral reflectance curves of glasses according to the invention as well as of known comparative glasses.

FIG. 2 shows the spectral reflectance of different embodiment examples of the invention.

The wavelength is plotted in nm on the x-axis, the component of spectral reflectance is given on the y-axis; a value of 1 would thus indicate the complete reflection of the respective wavelength.

All of the curves give the spectral reflectance after a ceramicizing process, thus after a temperature treatment at more than 700° C.

Curve 10 shows an example of embodiment with an 800-nm thick antimony-doped tin-oxide layer. The thickness of layer 11 amounts to 550 nm and that of layer 12 amounts to 500 nm. It should be recognized that the spectral reflectance is essentially better at wavelengths above 2000 nm in the case of the thinner layers than for the thicker layer. This shows possibilities for process technology.

Further, it should be recognized that the plasma edge of all three materials lies below 3000 nm and that the spectral reflectance in the visible region is less than 0.2 for all three layers. Even for a wavelength of approximately 2500 nm, the two thin layers, which are shown in curves 11 and 12, reach a spectral reflectance of more than 0.3. Starting from 3000 nm, the spectral reflectance in fact amounts to more than 0.4 in the layers according to curves 11 and 12.

Figure 3:
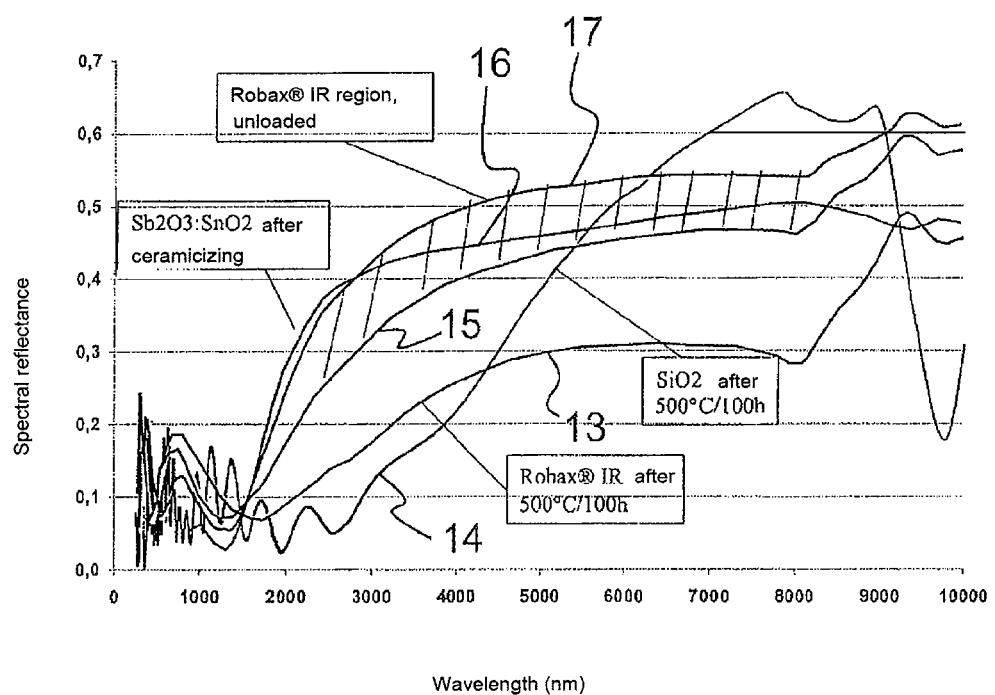

Corresponding to FIG. 2, the spectral reflectance values of different glass-ceramic panes are plotted in FIG. 3. Here, glass-ceramic panes known from the prior art were also investigated.

Curve 17 gives the spectral reflectance of an IR-reflecting coating based on fluorine-doped tin oxide. It should be recognized that the plasma edge of this material lies between 2000 and 3000 nm, and that the coating leads to a high reflectance, even starting from 2500 nm.

Curve 13 gives the spectral reflectance of this coating after a load of 500° C. for 100 hours. It can be recognized that the reflectance for wavelengths between 2000 and 5500 nm is considerably reduced and lies below 0.25 in the wavelength region between 2000 and 4000 nm, which is relevant for front panes. Therefore, the glass is not suitable for a permanent load of 500° C.

Curve 14 shows another glass provided with a coating reflecting infrared radiation, also after a temperature treatment of 500° C. over 100 hours. This glass also does not reach sufficient reflectance values.

Curves 15 and 16 show the spectral reflectance of two different embodiment examples of glass-ceramics panes that are provided with an antimony-doped tin-oxide layer after a ceramicizing process. It can be recognized that nearly the same good effect of reflecting infrared radiation is achieved as in the glass according to curve 17, which was not subjected to temperature loading. In particular, the plasma edge of the glass-ceramic panes according to curves 15 and 16 lies below 3000 nm.

Figure 4:
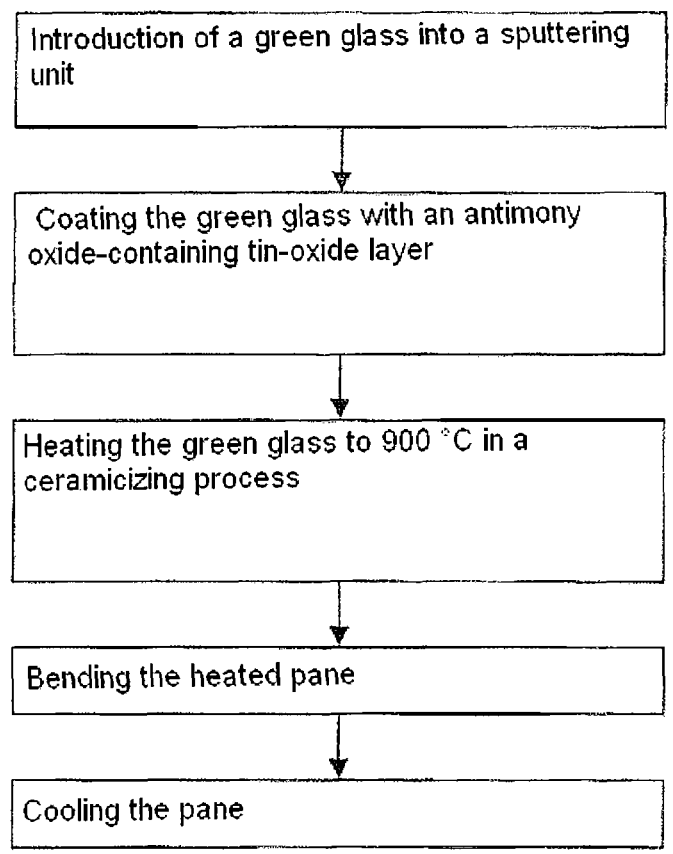
FIG. 4 shows method steps of a method for producing a glass or glass-ceramic pane will be explained in more detail.

Referring to FIG. 4, the essential method steps will be explained in more detail according to an example of embodiment of the invention In this method, a glass-ceramic pane is produced, which can be particularly used as a front pane for fireplace ovens.

A so-called green glass, i.e., an initial material for a ceramicizing process, is first introduced into a sputtering unit for this purpose.

The green glass is preferably coated with an antimony oxide-containing tin-oxide layer by means of a magnetron sputtering method.

The green glass is subsequently subjected to a ceramicizing process for producing glass ceramics and, in this case, is heated up to 900° C.

During or directly after the ceramicizing process, the heated pane is shaped, in order to obtain the desired final shape.

After cooling the pane, it can be used as an extremely temperature-resistant glass with an infrared radiation-reflecting effect; in particular, permanent use temperatures of 700° C. can be guaranteed.

It is understood that the invention is not limited to a combination of the features described above in the embodiment examples, but rather that the person skilled in the art will combine all of the described features or method step in any way that is technically meaningful.

What is claimed is:

1. A glass-ceramic pane, comprising a tin-oxide reflection layer comprising between 2 and 6 weight percent antimony oxide, the layer being deposited by using a sputtering method on a green glass blank that is ceramicized by a ceramicizing process after the deposition of the layer to form the pane such that the pane has a reflectance of more than 30% at a wavelength between 3000 and 4000 nm and an average transmittance in the region of visible light of more than 40%.

2. The glass-ceramic pane according to claim 1, wherein the pane comprises a bend, the bend being introduced during the ceramicizing process.

3. The glass-ceramic pane according to claim 1, wherein the layer is deposited on the green glass blank that is ceramicized by the ceramicizing process after the deposition of the layer to form the pane such that the pane is configured for use as a front pane for an oven, a front pane for a fireplace, a fire-proof door, or a fire-proof window.

4. A glass-ceramic pane comprising:
   a heat tempered tin-oxide layer that reflects infrared radiation that is applied by using a sputtering method and that comprises between 2 and 6 weight percent antimony, the tin-oxide layer being transparent in the visible region; and
   a glass-ceramic substrate being shaped after application of the tin-oxide layer to the glass-ceramic substrate and during ceramicizing of the substrate.

5. The glass-ceramic pane according to claim 4, wherein the tin-oxide layer is directly adjacent to the glass-ceramic substrate.

6. The glass-ceramic pane according to claim 4, further comprising a layer of bonding agent disposed between the glass-ceramic substrate and the tin-oxide layer.

7. The glass-ceramic pane according to claim 4, further comprising a reflectance of more than 30% at a wavelength between 3000 and 4000 nm.

8. The glass-ceramic pane according to claim 4, further comprising an average transmittance in the region of visible light of more than 40%.

9. The glass ceramic pane according to claim 4, wherein the glass ceramic pane is configured for use as a front pane for an oven, a front pane for a fireplace, a fire-proof door, or a fire-proof window.

10. The glass ceramic pane according to claim 4, wherein the glass-ceramic substrate is bent after application of the tin-oxide layer to the glass-ceramic substrate and during ceramicizing of the substrate.

11. An oven comprising a glass-ceramic pane with a tin-oxide reflection layer comprising between 2 and 6 weight percent antimony oxide, wherein the tin-oxide reflection layer reflects infrared radiation and is transparent in a region of visible light.

12. The oven according to claim 11, wherein the tin-oxide layer has a reflectance of more than 30% at a wavelength between 3000 and 4000 nm and an average transmittance in the region of visible light of more than 40%.

* * * * *